Figure 3:
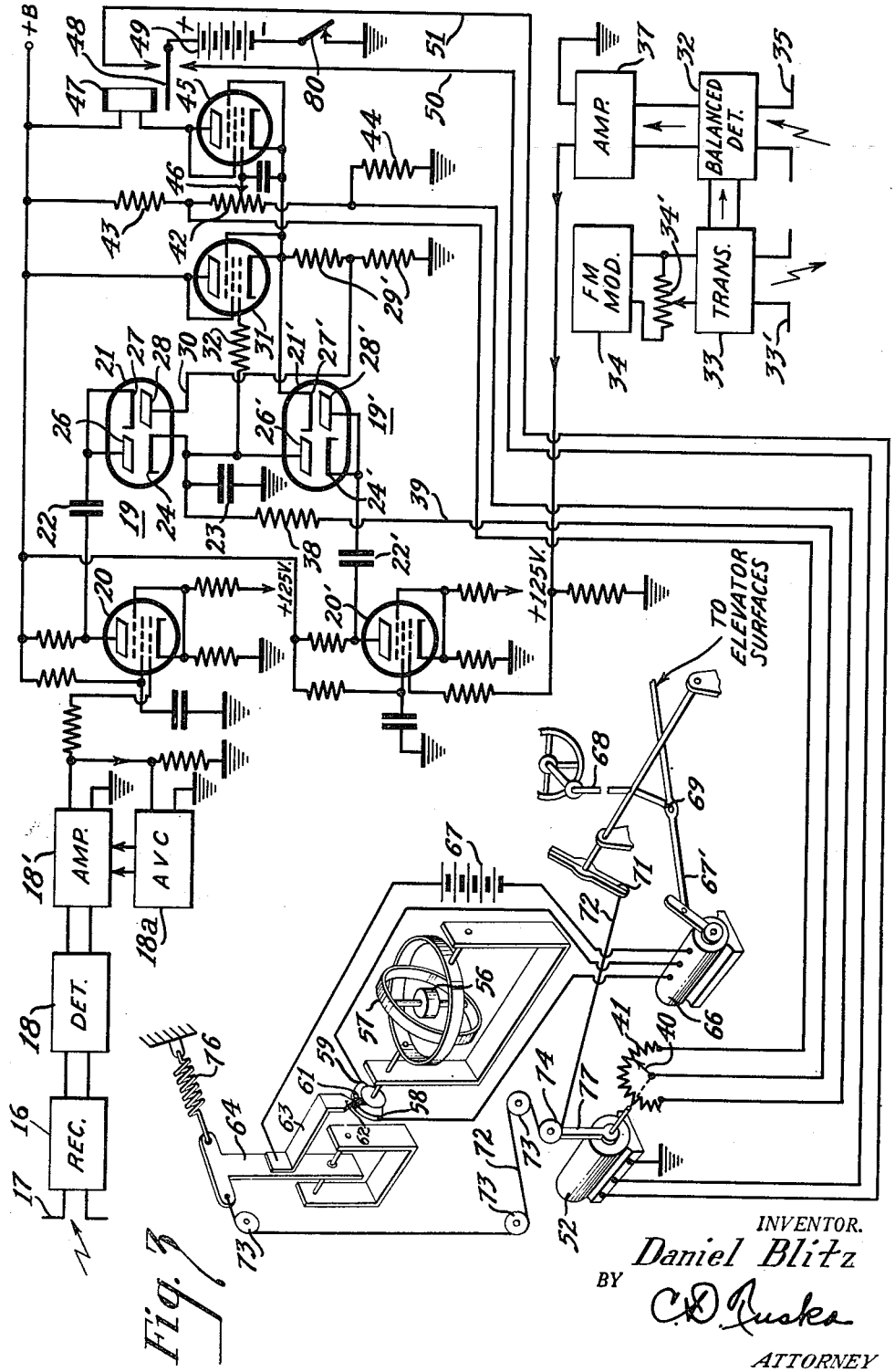

June 3, 1952     D. BLITZ     2,599,223
GLIDE PATH CONTROL FOR AIRCRAFT
Filed March 28, 1946     2 SHEETS—SHEET 1
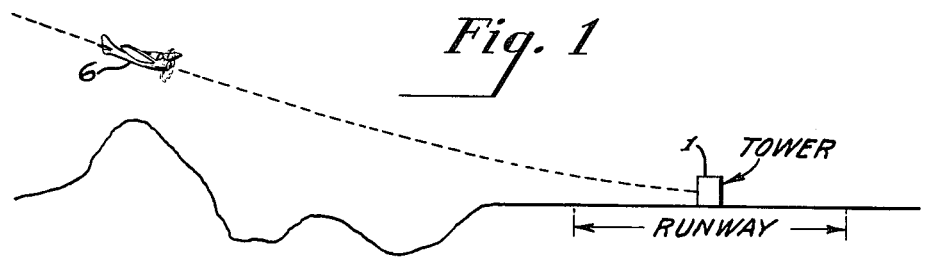
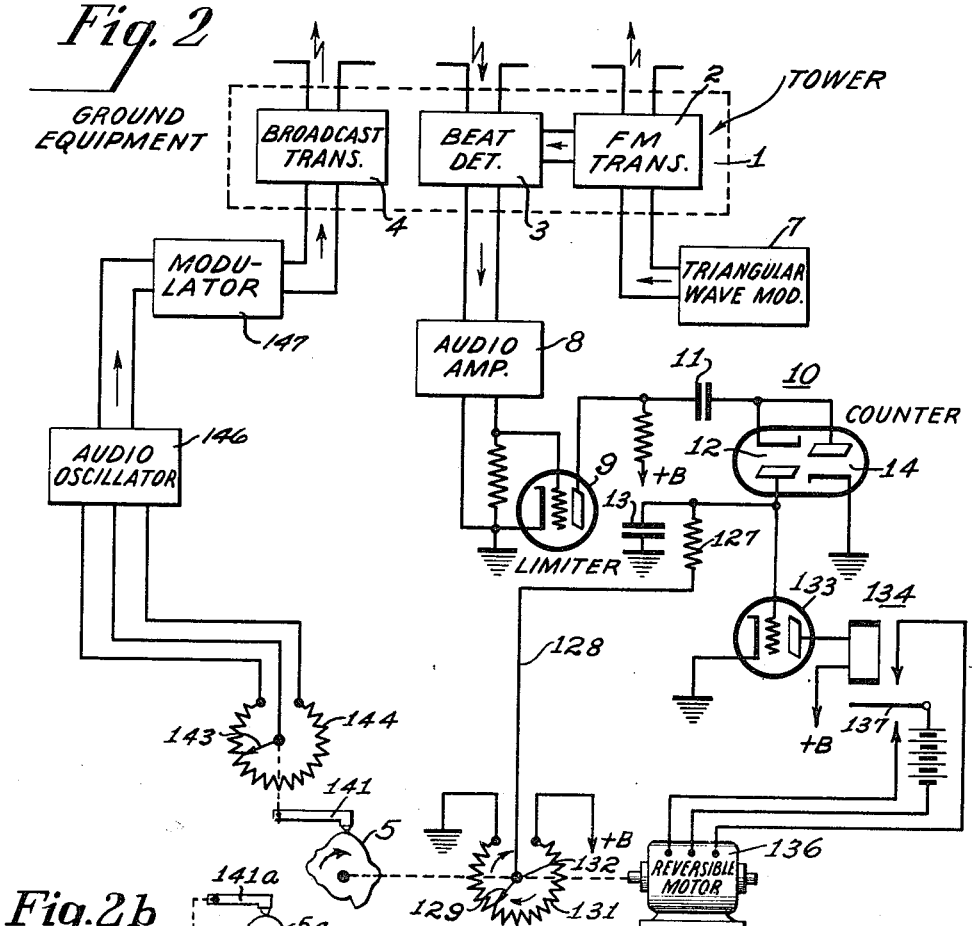
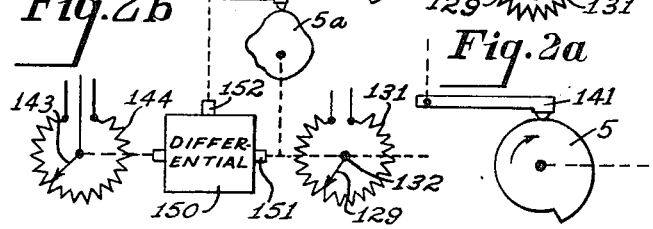
INVENTOR.
Daniel Blitz
BY
ATTORNEY Patented June 3, 1952

2,599,223

UNITED STATES PATENT OFFICE 2,599,223

GLIDE PATH CONTROL FOR AIRCRAFT

Daniel Blitz, Princeton, N. J., assignor to Radio Corporation of America, a corporation of Delaware Application March 28, 1946, Serial No. 657,688

9 Claims. (Cl. 343—7)

My invention relates to radar control systems and particularly to methods of and means for controlling the glide path of an aircraft as it approaches an airport for landing.

An object of the invention is to provide an improved method of and means for controlling the approach glide path of an aircraft over land, particularly over land that is irregular or hilly in contour.

Another object of the invention is to provide an improved system for causing an aircraft to follow a predetermined glide path in approaching an airport for a landing.

In certain copending applications there have been described systems for causing an aircraft to follow automatically a glide path over water for approaching a surface ship. For example, a drone loaded with explosives may be flown into an enemy ship in this way either in daylight or after dark or in a heavy fog. As an example of such a copending application, reference is made to application Serial No. 542,989, now Patent No. 2,454,009, issued November 16, 1948, filed June 30, 1944, in the name of Royden C. Sanders, Jr., and entitled Radar Control System.

The present application describes a system for causing an aircraft to follow a predetermined glide path over land of irregular contour as, for example, where the approach to an airport is over hilly terrain. According to the present invention the system includes a cam that has a contour corresponding to the profile of the terrain over which an aircraft is to fly in approaching an airport. Means is provided to transmit a control signal from a ground station to the aircraft control equipment which includes a radio altimeter. This control signal has a characteristic, such as frequency, that is a function of the contour of said cam. The control signal causes the aircraft control equipment to hold the aircraft on a smooth predetermined glide path regardless of the fact that the altimeter output signal is being changed by the hilly terrain. The control equipment on the aircraft may in large part be similar to that described in the above-mentioned Sanders application.

The invention will be better understood from the following description taken in connection with the accompanying drawing in which Figure 1 is a view showing, by way of example, an approach glide path for an aircraft and showing also the contour in elevation of the terrain over which the aircraft makes the approach, Figure 2 is a block and circuit diagram of a ground station embodying the invention, Figure 2a is a view showing a cam that may be used in the system shown in Fig. 2 where the terrain is level, Figure 2b is a view showing another embodiment of a portion of the apparatus shown in Fig. 2, and Figure 3 is a circuit diagram showing the aircraft control equipment according to one embodiment of the invention.

Referring to Figs. 1 and 2, a control tower 1 containing the apparatus of Fig. 2 is located at the airport and at one side of a runway. This ground equipment comprises a frequency modulated or FM radar system that includes an FM transmitter 2 and a beat frequency detector 3; it further comprises a broadcast transmitter 4 that transmits an audio frequency signal, the frequency of which is determined by a cam 5.

Referring more specifically to the ground radar station, it is similar to the well known FM altimeter but in the present instance it measures the distance to the approaching aircraft, i. e., the distance from the tower 1 to the aircraft 6 shown in Fig. 1. The transmitter 2 is cyclically frequency modulated by a triangular wave supplied from a generator 7. Some of the frequency modulated signal is supplied from the transmitter 2 to the detector 3 so that it beats with the signal reflected from an object, such as the aircraft 6, to produce an audio frequency signal which has a frequency that is a function of the distance to said object.

The audio frequency signal is supplied from the detector 3 through an amplifier 8 to a frequency measuring circuit which comprises a limiter tube 9 and a counter circuit 10. The circuit 10, which is of a well known type, comprises a comparatively small capacitor 11 and a diode 12 through which a pulse of energy is supplied to a comparatively large capacitor 13 each time a negative half cycle occurs in the square wave supplied from the limiter 9. The capacitor 11, sometimes referred to as the "bucket capacitor," is discharged through the diode 14 at the end of each negative half cycle.

A leakage path and a bias connection are provided from the anode end of capacitor 13 through a resistor 127, a conductor 128, a potentiometer arm 129 and a potentiometer resistor 131 which is connected to a voltage source not shown. The voltage across the resistor 127 reaches an equilibrium value in operation and is a measure of the distance to the approaching aircraft. The potentiometer shaft 132 carrying the arm 129 is caused to assume an angular position that is a function of said distance, this being accomplished by means of a follow-up circuit that comprises an amplifier tube 133, a relay 134 and a reversible motor 136.

The grid of the tube 133 is connected to the anode end of capacitor 13 so that the anode current of the tube 133 changes with any change in the voltage across the capacitor 13. The anode current operates the marginal relay 134 which has an armature 137 that moves into contact with either its upper contact point or its lower contact point if the anode current departs from a predetermined value. This causes the motor 136 to run in one direction or the other to drive the potentiometer arm 129 in a corresponding direction. As a result, the bias voltage applied through the lead 128 and the resistor 127 is changed in the direction tending to stop the motor 136. As the aircraft 6 approaches the runway, the angular position of potentiometer shaft 132 changes and is always a function of the distance to said aircraft.

The cam 5 is coupled to the shaft 132 so that its angular position is also a function of the distance to the aircraft 6. Thus, the cam follower 141 always rides on a portion of the cam where the cam contour corresponds to the contour of the terrain underneath the approaching aircraft. The shaft 142 of the cam follower 141 is coupled to the arm 143 of a potentiometer 144 so that the position of the arm 143 is determined by the cam 5.

Referring again to the broadcast transmitter 4, it is modulated by the output of an audio frequency oscillator 146 which is supplied to a suitable transmitter modulator 147. The frequency of the oscillator 146, which may be any one of many well known types, is determined by the position of the potentiometer arm 143 and, therefore, by the contour of the cam 5. Thus the audio control signal that is transmitted from the transmitter 4 has a frequency that is a function of the distance from the tower 1 to the aircraft 6 and also a function of the contour of the terrain.

It may be noted that if the approach to the runway is over level ground, the shape of the cam will resemble that shown in Fig. 2a, i. e., the cam contour will change uniformly so that the control signal will decrease uniformly in frequency as the distance from the tower 1 to the aircraft 6 decreases. In the example illustrated in Figs. 1 and 2, the cam contour causes a still further decrease in control signal frequency when the aircraft is over a hill as shown in Fig. 1, and thus the ratio of control signal frequency to altimeter signal frequency is constant so long as the aircraft is on the proper glide path.

Instead of shaping the cam so that its contour is a function of both distance and terrain elevation, it may be preferable to employ the arrangement of Fig. 2b where the cam contour is a function of the terrain elevation only. In this case the potentiometer arm 143 is driven by the "distance" shaft 132 through a differential unit 150. The shaft 132 is coupled directly to one input shaft 151 of the unit 150 and is coupled by way of a cam 5a and a cam follower 141a to the other input shaft 152. In this example the cam 5a will be circular in contour if the terrain under the approach path is level.

It may be noted that if other than a straight line glide path is desired, this may be obtained by selecting a suitable contour for the cam. For instance, in the above-mentioned example where the cam 5a is circular for a straight line glide path, it may be given a different contour, such as a spiral contour, for glide path that becomes less steep as the aircraft approaches the landing strip.

The manner in which the audio frequency control signal is utilized at the approaching aircraft 6 for controlling the glide path will now be described with reference to Fig. 3.

The radio signal which is modulated by the audio frequency control signal is picked up by an antenna 17 and supplied to a receiver 16 and a detector 18 where it is demodulated. The resulting audio frequency signal is passed through an amplifier 18' to an amplitude limiter 20 and the resulting square wave signal is applied to a frequency counter 19. The amplifier 18' preferably is provided with an automatic volume or gain control circuit 18a.

The counter 19 comprises a pair of oppositely connected diodes in a common envelope 21 to which the square wave from the limiter 20 is applied through a capacitor 22 of comparatively small capacity. A storage capacitor 23 of comparatively large capacity has a charge supplied to it through the cathode 24 and anode 26 of one diode section upon the occurrence of each positive half cycle of the square wave. Since the capacitor 22 is small enough to reach full charge during the first part of a square wave half cycle, the storage capacitor 23 is charged up a fixed additional amount each time a positive half cycle occurs whereby the voltage thereacross is proportional to the frequency of the audio frequency control signal. This is assuming for the moment that the charge on capacitor 23 is not being affected by the altimeter counter 19' circuit described hereinafter. The voltage appearing across the capacitor 23 is applied to the grid of a vacuum tube 31 through a tube protective resistor 32.

The diode section which comprises a cathode 27 and an anode 28 is provided to discharge the capacitor 22 at the end of each positive half cycle. The anode 28 is connected through a lead 30 to an intermediate point on a cathode resistor 29 of the vacuum tube 31 (rather than directly to the cathode of tube 31) to prevent current flow through the diode 27, 28 due to contact potential and to maintain as nearly as possible the charge delivered each cycle by capacitor 22 a constant value independent of frequency, thus making the output of the counter very nearly linear with respect to frequency.

A radio altimeter is provided which includes the counter 19', previously mentioned, which is connected so that its diodes and those of the counter 19 supply current to the capacitor 23 in opposing or differential relation.

The altimeter comprises a frequency-modulated transmitter 33 that radiates the signal downwardly from an antenna 33'. The transmitter may be frequency modulated by a modulating oscillator 34 which supplies a triangular wave modulating signal, for example. The band width of the frequency modulation sweep may be adjusted by means of a variable tap 34'. The reflected signal is received by an antenna 35 and supplied to a detector 32 where it beats with the frequency modulated signal supplied directly from the transmitter 33 to produce an audio signal having a beat frequency that corresponds to the altitude of the aircraft 6.

The beat frequency signal is supplied through an amplifier 37 and through an amplitude limiter tube 20' to the frequency counter 19'. The counter 19' is of the same general type as the counter 19, but it is a negative counter whereas the counter 19 is a positive counter. The parts in counter 19' corresponding to those in the counter 19 are indicated by the same reference numerals with a prime mark added. The storage capacitor 23 is common to the two diode sections 24, 26 and 24', 26', the first section supplying current to capacitor 23 during the positive half cycles of the audio frequency control signal to make its upper terminal more positive, and the other section 24', 26' supplying current to capacitor 23 during the negative half cycles of the altitude signal to make its upper terminal less positive. Thus, the potential at said upper terminal is the difference in the outputs of the two counters, and the outputs of the two counters are proportional to the control signal frequency and to the altimeter beat frequency, respectively. So long as the aircraft is on the proper glide path, the difference of the two counter outputs is zero. It will be noted that the cathode 27' is connected to the cathode of the cathode-follower tube 31, instead of to ground, whereby the negative counter 19' also is made substantially linear. Bias for follow-up control is applied to the counters 19 and 19' through a resistor 38 which is connected through a conductor 39 to a follow-up tap 40 on a voltage divider resistor 41. The resistor 41 is connected across a resistor 42 which is one section of a voltage divider comprising resistors 43, 42 and 44.

The cathode follower tube 31 is coupled to a vacuum tube 45 which has its control grid held at a fixed bias having a value determined by the setting of a variable tap 46 on the resistor 42. The plate circuit of the tube 45 includes a relay coil 47 for actuating an armature 48. The relay 47, 48 is operated around the point where the plate current of the tube 31 equals the plate current of the tube 45, on one side of this point the tube 31 going to plate current cut-off and on the other side of this point the tube 45 going to plate current cut-off due to current flow through the cathode resistor 29.

Thus, the relay armature 48 connects a D. C. source 49 through one of the conductors 50 and 51 to a reversible motor 52, referred to as the pitch motor, with the correct polarity for either forward or reverse operation, depending upon whether the differential output of the counters 19 and 19' is above or below a predetermined value. The D. C. operating voltage for the limiter and counter tubes is taken from a common source to avoid any unbalance due to changes in the operating voltage amplitude. The pitch motor 52 is mechanically coupled to the follow-up tap 40 whereby the counter bias is changed when the motor 52 rotates, the bias change being in the direction to stop the motor rotation.

It has been shown how the motor 52 is caused to rotate in one direction or the other (moving the follow-up tap 40 with it) in response to a departure from the desired ratio of control signal frequency to altimeter beat frequency caused by the aircraft getting either above or below the desired glide path. This rotation of the motor 52 functions primarily to control the elevator surfaces of the aircraft for bringing it back to the desired glide path. In the example illustrated, the motor 52 is tied in with an automatic pilot mechanism of known construction that also controls the elevator surfaces and which will now be described.

The automatic pilot includes a longitudinal attitude control gyroscope 56 provided with a gimbal ring 57, carrying two conducting sectors 58 and 59 separated by a small insulating sector 61. A contact 62, engaging either the sector 61 or one of the conducting sectors 58 and 59, is on the end of a lever 63 that is attached to a pivotally mounted supporting member 64 so that the contact 62 will be guided in an arcuate path about the sectors 58, 59 and 61. The sectors 58 and 59 are connected to two terminals of a reversible follow-up motor 66 while the contact 62 is connected through the lever 63 and through a direct-current source 67 to a third terminal of the motor 66. The shaft of the motor 66 is mechanically coupled through a linkage 67' to the elevator surfaces (not shown) of the airplane.

The control stick 68 of the airplane is connected at a pivot 69 to the control linkage, and through an arm 71 to a cable 72. The cable 72 is guided over a plurality of pulleys 73 and a pulley 74 and connected to the supporting arm 64 carrying the contact 62. A spring 76 is provided to maintain the cable 72 under tension. The pulley 74 is supported at the end of a lever 77 secured to the shaft of the reversible pitch motor 52.

Neglecting temporarily the effect of operating the motor 52, the operation of the automatic pilot system when adjusted for level flight is as follows: The gyroscope 56 tends to maintain a constant attitude, with its rotor in a plane parallel to the surface of the earth. The movable contact 62 normally engages the insulating sector 61. Any deviation of the airplane from level flight will move the contact 62 with respect to the ring 57, and into contact with sector 58 and 59. Thus the motor 66 will be energized so as to run in the proper direction to adjust the elevator control surfaces to cause the airplane to resume its attitude for level flight.

When the motor 66 is operating to adjust the elevator surfaces, it also moves the cable 71, thereby rotating the contact 62 with respect to the longitudinal axis of the craft. When the contact 62 reaches the insulated sector 61, the motor 66 is deenergized. During this time the elevator surfaces have been bringing the aircraft back toward the position of level flight. As the airplane continues toward its normal attitude, the contact 62, which has been displaced ahead of the gyroscope, passes the insulated sector and engages the opposite conducting sector, causing the motor 66 to run in the reverse direction. This returns the control surfaces toward the position for a level flight. Thus, the applied control is removed as the airplane is returning to its normal attitude, so that the control surface will be back in its neutral or central position when the disturbance has been corrected. Briefly, a follow-up action has been applied to control the aircraft's attitude as a function of the gyro control.

The operation of the complete system while holding the aircraft on the desired glide path will now be described, assuming a method of operation where the automatic pilot adjustment is the one previously described which holds the aircraft in level flight in the absence of a control action from the differential counter circuit. As the aircraft approaches the airport it automatically either increases or decreases altitude to get on the glide path and remains on this path, the control operation being as follows:

The relay armature 47 is moved to either its lower or upper position depending on whether the differential output of counters 19 and 19' is greater or less than a certain predetermined value, thus energizing the pitch motor 52 to move the pulley 74, displacing the contact 62 from the level flight position, and causing the attitude of the airplane to change in the direction for either increasing or decreasing descent.

At the same time, the pitch motor 52 also moves the follow-up tap 40 along the resistor 41, thus changing the counter bias voltage applied through resistor 38 to the counters 19 and 19' in the direction to reverse the position of the relay armature 48. The lever 77 and the follow-up tap 40 are normally centered for level flight in the method of operation being described. Assume that as the airplane moves toward the airport, its rate of descent is too gradual so that its flight path is above the desired glide path. Since the ratio of altimeter output frequency to control signal frequency is too high, the relay 47, 48 is actuated to start the motor 52 and thus change the position of the pulley 74. This moves the contact 62 with respect to the gimbal ring 57, operating the motor 66 to change the flight attitude so as to bring the airplane to the correct glide path. Motion of the pitch motor 52 also moves the follow-up tap 40, changing the counter bias voltage in the sense to increase the current in the relay coil 47 whereby as the airplane approaches the desired glide path, the relay 47, 48 is operated to reverse the motor 52, returning the follow-up tap 40 and the contact 62 to their normal positions for the correct glide path. In the example just described, mechanical control ratios between the motor 52, the pulley 74 and the follow-up tap 40 are such that the contact 62 is centered when the craft is in level flight.

Instead of adjusting the system so that the automatic pilot gyroscope 56 tends to hold the aircraft in level flight in the absence of the differential counter control, it may be preferred to adjust or bias the gyroscope so that the automatic pilot itself holds the aircraft approximately on the correct glide path. In this method of operation, the radio control system has greater operating range in holding the aircraft exactly on the desired glide path; it now has only to correct for the amount that the gyroscope 56 fails to hold the aircraft on the desired glide path. The following procedure may be practiced when this method of operation is employed:

As soon as it is desired that the aircraft shall start on the glide path, the bias of the gyroscope 56 is changed to the glide path adjustment and, at the same time, the radio differential counter control is switched in as by closing a switch 80 in the power supply circuit for the pitch motor 52.

It will be understood that when the aircraft controls are switched over to the differential counter glide-path control, the aircraft will immediately seek the correct glide path and will either climb or descend to reach this path unless it happens to be on the correct glide path at the time.

I claim as my invention.

1. An aircraft control system comprising a radar system located at an airport for determining the distance to an approaching aircraft, means comprising a radio system at said airport for transmitting to said aircraft a control signal having a frequency that is a function of said distance, and a radio control system on said aircraft whereby it may be held on a predetermined glide path, said aircraft borne control system comprising a radio altimeter that supplies an output signal having a frequency that is a function of altitude and comprising a radio receiver for receiving said control signal, and further comprising means responsive to a change in the ratio of the frequency of said altimeter output signal to the frequency of said control signal.

2. An aircraft control system comprising a radar system located at an airport for determining the distance to an approaching aircraft, means comprising a radio system at said airport for transmitting to said aircraft a control signal having a characteristic that is a function of said distance, and a radio control system on said aircraft for holding said aircraft automatically on a predetermined glide path, said aircraft borne control system comprising a radio altimeter that supplies an output signal that is a function of altitude and further comprising a radio receiver for receiving said control signal, and means for controlling the altitude of said aircraft as a function of said altimeter output signal and said control signal.

3. An aircraft control system comprising a radar system located at an airport for determining the distance to an approaching aircraft, means comprising a radio system at said airport for transmitting to said aircraft a control signal having a characteristic that is a function of said distance and also a function of the contour of the land over which said aircraft is approaching, and a radio control system on said aircraft for holding said aircraft automatically on a predetermined glide path, said aircraft borne control system comprising a radio altimeter that supplies an output signal that is a function of altitude and further comprising a radio receiver for receiving said control signal, and means for controlling the altitude of said aircraft as a function of said altimeter output signal and said control signal.

4. An aircraft control system comprising a radar system located at an airport for determining the distance to an approaching aircraft, means comprising a radio system at said airport for transmitting to said aircraft a control signal having a frequency that is a function of said distance and also a function of the contour of the land over which said aircraft is approaching, and a radio control system on said aircraft for holding said aircraft automatically on a predetermined glide path, said aircraft borne control system comprising a radio altimeter that supplies an output signal having a frequency that is a function of altitude and further comprising a radio receiver for receiving said control signal, and means for changing the altitude of said aircraft in response to a change in the ratio of the frequency of said altimeter output signal and the frequency of said control signal.

5. In an aircraft control system, a radar system located at an airport for determining the distance to an approaching aircraft, said radar system including follow-up means for causing a shaft to assume an angular position that is a function of said distance, a cam that is coupled to said shaft for rotation therewith, said cam having a contour that is a function of said distance, a radio transmitter for transmitting a control signal to said aircraft, and means for modulating said transmitter in accordance with the contour of said cam as it is rotated by said shaft.

6. In an aircraft control system, a radar system located at an airport for determining the distance to an approaching aircraft, said radar system including follow-up means for causing a shaft to assume an angular position that is a function of said distance, a cam that is coupled to said shaft for rotation therewith, said cam having a contour that is a function of both said distance and the contour of the terrain over which said aircraft is approaching, a radio transmitter for transmitting a control signal to said aircraft, and means for modulating said transmitter in accordance with the contour of said cam as it is rotated by said shaft.

7. In an aircraft control system, a radar system located at an airport for determining the distance to an approaching aircraft, said radar system including follow-up means for causing a distance shaft to assume an angular position that is a function of said distance, a cam having a contour that is a function of the contour of the terrain over which said aircraft is approaching, a differential unit having two input shafts and an output shaft, means for coupling said distance shaft directly to one of said input shafts, means for coupling said distance shaft to the other of said input shafts through said cam whereby said output shaft is rotated as a function of said distance and said cam contour, a radio transmitter for transmitting a control signal to said aircraft, and means for modulating said transmitter in accordance with the rotation of said output shaft.

8. Air borne equipment for causing an aircraft to follow a predetermined glide path to a landing strip, said equipment comprising a radio altimeter that supplies an output signal having a characteristic that is a function of altitude, a radio receiver for receiving from a ground station a control signal having a characteristic that is a function of the distance to said landing strip and also a function of the contour of the terrain under said aircraft, and means for controlling the altitude of said aircraft as a function of both the said altimeter output signal and said control signal.

9. Air borne equipment for causing an aircraft to follow a predetermined glide path to a landing strip, said equipment comprising a radio altimeter that supplies an output signal having a frequency that is a function of altitude, a radio receiver for receiving from a ground station a control signal having a frequency that is a function of the distance to said landing strip and also a function of the contour of the terrain under said aircraft, and means for controlling the altitude of said aircraft in accordance with the ratio of the frequency of said altimeter output signal and the frequency of said control signal.

DANIEL BLITZ.

REFERENCES CITED

The following references are of record in the file of this patent:

UNITED STATES PATENTS

| Number | Name | Date |
|---|---|---|
| 2,187,097 | Pope | Jan. 16, 1940 |
| 2,252,083 | Luck | Aug. 12, 1941 |
| 2,322,448 | Holmes | June 22, 1943 |
| 2,372,620 | Williams | Mar. 27, 1945 |
| 2,412,003 | Neufeld | Dec. 3, 1946 |
| 2,412,632 | Sanders | Dec. 17, 1946 |
| 2,421,106 | Wight | May 27, 1947 |
| 2,423,336 | Moseley | July 1, 1947 |
| 2,433,782 | Murdock | Dec. 30, 1947 |
| 2,436,846 | Williams | Mar. 2, 1948 |
| 2,454,009 | Sanders | Nov. 16, 1948 |
| 2,459,482 | Bond | Jan. 18, 1949 |
| 2,466,534 | Cole | Apr. 5, 1949 |